(12) United States Patent
Clauberg

(10) Patent No.: US 8,107,362 B2
(45) Date of Patent: Jan. 31, 2012

(54) MULTI-RING RESILIENT PACKET RING ADD/DROP DEVICE

(75) Inventor: Rolf Clauberg, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 1595 days.

(21) Appl. No.: 10/872,758

(22) Filed: Jun. 21, 2004

(65) Prior Publication Data

US 2007/0058572 A1  Mar. 15, 2007

(51) Int. Cl.
*G01R 31/08* (2006.01)
(52) U.S. Cl. .......................... 370/222; 370/258
(58) Field of Classification Search .................. 370/216, 370/218, 222, 223, 230, 235, 258, 389, 392, 370/404
See application file for complete search history.

(56) References Cited

U.S. PATENT DOCUMENTS

| 5,838,477 | A * | 11/1998 | Yamamoto et al. | 398/105 |
|---|---|---|---|---|
| 7,061,861 | B1* | 6/2006 | Mekkittikul et al. | 370/230 |
| 2003/0007513 | A1* | 1/2003 | Barker et al. | 370/476 |
| 2003/0101248 | A1* | 5/2003 | Tofinetti et al. | 709/223 |
| 2004/0052520 | A1* | 3/2004 | Halgren et al. | 398/5 |
| 2004/0103179 | A1* | 5/2004 | Damm et al. | 709/223 |
| 2004/0179518 | A1* | 9/2004 | Bruckman et al. | 370/358 |

* cited by examiner

*Primary Examiner* — Jung Park
(74) *Attorney, Agent, or Firm* — Cahn & Samuels, LLP

(57) ABSTRACT

A Resilient Packet Ring (RPR) add/drop device to connect multiple rings, e.g. SDH/SONET rings, wavelength or fibers, to a single switch or router device is disclosed. The add/drop device according to the invention comprises two multiplexing framer devices and an Add/Drop Multiplexor-Media Access Control (ADM-MAC) device. Each of the multiplexing framer devices combine at least two RPR data signals having an input data rate into a single data stream having an output data rate being higher than the input data rate for transmission on a shared medium or vice versa. The ADM-MAC device interfaces the two multiplexing framer devices and the switch or router device.

9 Claims, 5 Drawing Sheets

MULTI-RING RESILIENT PACKET RING ADD/DROP DEVICE

FIELD OF THE INVENTION

The present invention relates to Resilient Packet Ring (RPR) add/drop devices and more specifically to a device that allows connection of several RPR rings to a single link layer interface (switch or router device).

BACKGROUND OF THE INVENTION

Since data communication traffic increases dramatically, Resilient Packet Ring systems (RPR), a new Media Access Control layer technology (MAC), is being standardized by the IEEE 802.17 standard working group. Resilient packet ring system takes best of both SDH/SONET and Ethernet technologies so as to provide a system operating over ring topologies that employs spatial reuse to maximize bandwidth utilization, provides a distributed fairness algorithm, and ensures high-speed traffic protection. It allows full ring bandwidth to be utilized under normal conditions and protects traffic in the case of node or fiber failures while presenting advantages of low cost equipment, high bandwidth granularity, and statistical multiplexing capability.

Resilient Packet Ring systems are developed as a highly resilient data transport network using two counterrotating fiber rings with automatic protection switching of priority data between these rings if a ring segment is unreachable through a local failure on one of the rings. The emphasis for RPR systems is on very high reliability fulfilling the requirement that each sub-network is operational at least 99.999% of total time. This is achievable only with protection switching and plug & play redundancy of key network components. The protection switching is very similar to that of SDH/SONET networks. However, while a SDH/SONET network uses only one of the two rings for normal operation and restricts the second ring to automatic protection switching only, an RPR network uses both rings already in normal operation. Another important difference between SDH/SONET and RPR networks is that RPR networks directly operate with IP packets over fiber at each node in the ring while SDH/SONET networks operate with virtual containers containing IP packets and only source and destination node map or extract the IP packets (or other data formats) in/out of the virtual containers.

RPR networks are planned to reuse SDH/SONET and Ethernet devices of physical layer (referred herein below to as PHY devices). Hence, RPR is considered to work in the MAC layer on top of the physical layer. Accordingly, an RPR system may forward RPR frames to or receive RPR frames from an SDH/SONET or Ethernet framer. RPR systems are planned as local area networks (LAN), metropolitan area networks (MAN), and wide area networks (WAN) with data rates in the rings ranging to 40 Gb/s and higher.

Many present SDH/SONET networks offer capacities of 40 Gb/s or higher in form of multiple 10 Gb/s or even 2.5 Gb/s rings. Offering high data rates through the use of multiple wavelengths each carrying a fragment of the aggregate data rate opens a way to offer high data rates unachievable by other means or before achievable by future optical technologies or simply in a more cost efficient way. In many cases such networks evolved because it was easier to upgrade the aggregate data rate of existing networks by adding additional rings (wavelengths) to the system than by upgrading every node in the system to a higher single wavelength data rate. There are even SDH/SONET framers which exploit this fact by handling multiple SDH/SONET ports in parallel. As illustrated on FIG. 1, designing an RPR system on top of a multi-ring network in the usual way would require the use of many parallel RPR add/drop devices 102-1 to 102-*n*, one per ring 100-1 to 100-*n*, plus an additional data aggregation device 104 for the traffic going from the multi-ring network to the link layer interface, e.g. switch or router device 106, a very costly implementation.

SUMMARY OF THE INVENTION

Thus, it is a broad object of the invention to remedy the shortcomings of the prior art as described here above.

It is another object of the invention to provide a single Resilient Packet Ring (RPR) add/drop device to connect multiple rings (wavelength or fibers) to a single link layer interface.

It is a further object of the invention to provide a single Resilient Packet Ring (RPR) add/drop device to connect multiple rings (wavelength or fibers) to a single link layer interface, supporting plug & play redundancy.

The accomplishment of these and other related objects is achieved by an add/drop device for connecting at least two network dual rings to a single link layer interface, said device comprising:

a first and a second ports for each of said at least two network dual rings for receiving signals from or transmitting signals to each of said at least two network dual rings;

first and second multiplexing framer means adapted for:
combining at least two data signals having their own input data rates into a single output data streams having an output data rates higher than said input data rates of said data signals;
splitting a single input data stream having an input data rate into at least two data signals having their own output data rates, lower than said input data rate of said single input data stream;
said first multiplexing framer means receiving signals from or transmitting signals to said first ports and said second multiplexing framer means receiving signals from or transmitting signals to said second ports;

add/drop means adapted for:
extracting data from a single output data stream received from one of said first and second multiplexing framer means and transmitting said extracted data to said link layer interface;
inserting data received from said link layer interface to a single output data stream received from one of said first and second multiplexing framer means;
transmitting a single output data stream received from one of said first and second multiplexing framer means, wherein data may have been extracted or inserted, to one of said first and second multiplexing framer means.

Further advantages of the present invention will become apparent to the ones skilled in the art upon examination of the drawings and detailed description. It is intended that any additional advantages be incorporated herein.

DETAILED DESCRIPTION OF THE PREFERRED EMBODIMENT

In the following description, RPR add/drop device according to the invention is based on a STM-1 to STM-64 SDH/SONET framer with data multiplexing from a series of configurable I/O ports wherein the payload processor is implemented on another chip. A corresponding SDH/SONET device is described in U.S. patent application Ser. No. 09/880,450 assigned to IBM Corporation and filed before the United States Patent and Trademark Office on Jun. 13, 2001.

Figure 1:
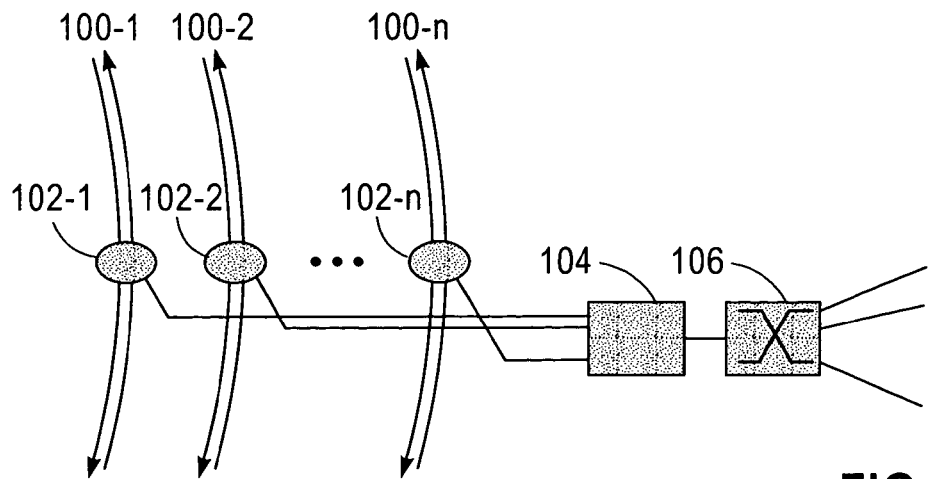
FIG. 1 illustrates an RPR system on top of a multi-ring network that requires the use of many parallel RPR add/drop devices plus an additional data aggregation device for the traffic going from the multi-ring network to a connected switch or router device, according to the prior art.
Figure 2:
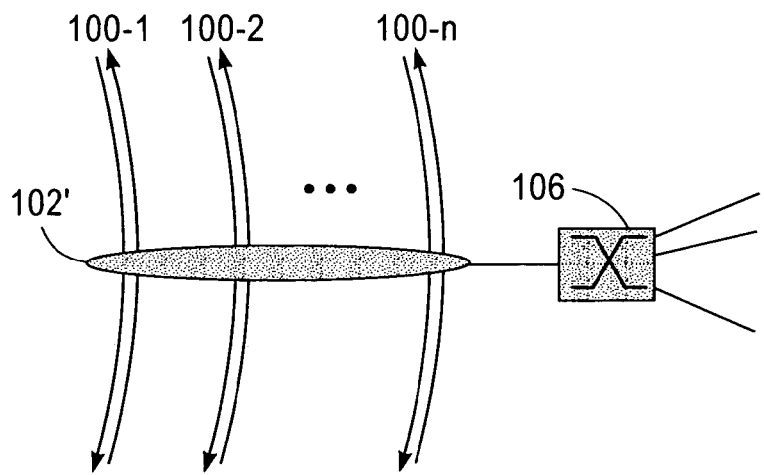
FIG. 2 illustrates the RPR add/drop device of the invention to connect a multi-ring network to a switch or router device.

The main principle of the invention consists in exploiting multiple parallel data rings for RPR systems by creating an RPR add/drop device 102' that is capable of processing RPR frames for/from multiple rings (wavelengths/fibers) 100-1 to 100-n as illustrated on FIG. 2 to transmit and receive data from/to a switch or router device 106. The device is designed to exploit corresponding multi-port SDH/SONET or Ethernet PHY devices.

Figure 3:
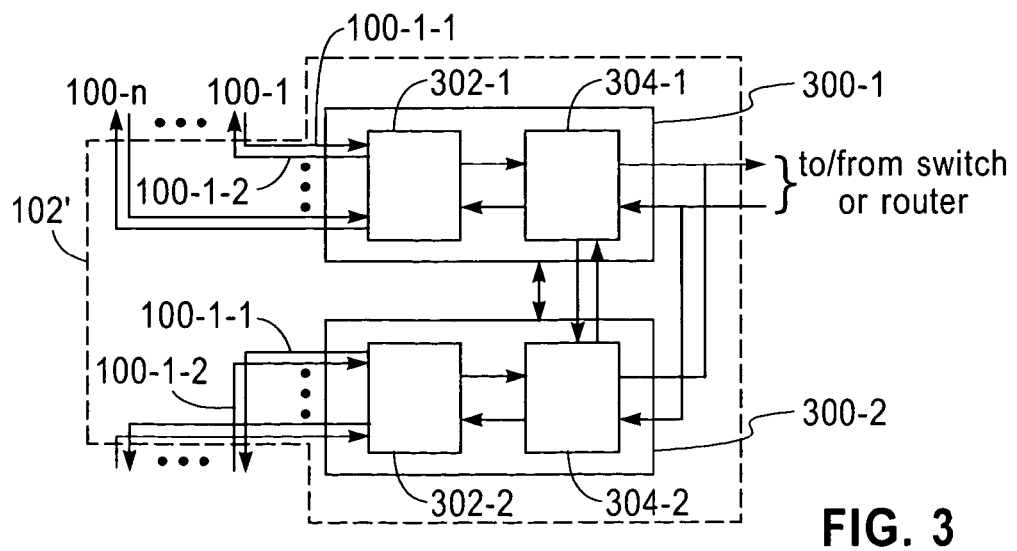
FIG. 3 depicts the global architecture of the RPR add/drop device of the invention.

FIG. 3 depicts globally the architecture of the RPR add/drop device of the invention to connect several rings 100-1 to 100-n to a switch or router device. In this first embodiment, the add/drop device of the invention supports plug & play redundancy. Since this device supports plug & play redundancy, it consists of two separated elements 300-1 and 300-2, e.g. Printed Circuit Boards (PCBs). For sake of illustration, separated elements 300-1 and 300-2 are assumed to be PCBs in the following description. Each PCB 300-1 and 300-2 comprises a PHY device 302-1 and 302-2 respectively and an add/drop multiplexor MAC (ADM-MAC) device 304-1 and 304-2 respectively. For sake of illustration, PHY and ADM-MAC devices are interfaced with SPI-5 standard interface in the following description however, it is to be understood that any RPR frame links may be used.

PHY devices 302-1 and 302-2 receive RPR frames from RPR rings 100-1 to 100-n and multiplex these RPR frames into a single data stream to transmit data to ADM-MAC devices 304-1 and 304-2 respectively. Likewise, PHY devices 302-1 and 302-2 receive frames from ADM-MAC devices 304-1 and 304-2 respectively through a single data stream and demultiplex these frames into RPR frames that are transmitted to rings 100-1 to 100-n. ADM-MAC devices 304-1 and 304-2 can be considered as an interface between PHY devices 302-1 and 302-2 respectively and a switch or router device (not represented for sake of clarity). Hence, each unit of ADM-MAC in the data path works on data from a specific ring (corresponding to one specific data channel), in one clock cycle and may work on data of another ring in the next clock cycle. All intermediate results are stored in memory per data channel and processing unit. Therefore designing the RPR-add/drop unit to handle a data rate of 40 Gb/s also allows to handle the 40 Gb/s data rate as an aggregate data rate built with 4 channels of 10 Gb/s each or 16 channels of 2.5 Gb/s each and so on. PHY devices 302-1 and 302-2 are described hereafter by reference to FIGS. 4 and 5 and ADM-MAC devices 304-1 and 304-2 are described by reference to FIGS. 6 and 7. PHY devices 302-1 and 302-2 are generically referred to as 302 and ADM-MAC devices 304-1 and 304-2 are generically referred to as 304.

ADM-MAC devices 304-1 and 304-2 also handle redundancy feature between PCBs 300-1 and 300-2. Dividing the critical parts in two PCBs allows full operation of the ring system as well as access to the rings from the local switch fabric while replacing one of the PCBs if components of this PCB fail. Such a separation of components is well known for the PHY units in an SDH/SONET add/drop multiplexer. Skipping the ADM-MAC units in above figure yields a well-known solution for SDH/SONET add/drop multiplexers. However, in SDH/SONET systems only one ring is used for normal data transfer, the second one is used in case of a protection switching event only. Therefore, SDH/SONET systems simply use device drivers for the connection to the switch or router device and only the drivers from one PHY are enabled. In case of a protection switching event, the device drivers of the other PHY are enabled and the one on the first PHY are disabled. The situation is more complex with RPR systems since both rings are used for normal data transmission, data from both ADM-MACs must be send to the switch or router device at every moment. Thus, it is requested to establish a data connection to send data from a first ADM-MAC destined for the switch or router device through the second ADM-MAC to the switch or router device, while the device drivers for the direct connection from the first ADM-MAC to the switch or router device are disabled as long as the first ADM-MAC receives a confirmation signal that data is successfully forwarded to the switch or router device from the second ADM-MAC. As soon as this confirmation signals fails, the device drivers for direct data forwarding from the first ADM-MAC to the switch or router device are enabled.

Thus, considering ring 100-1 comprising rings 100-1-1 and 100-1-2 referred to as ring 1 and ring 2 respectively for sake of clarity, the relevant data path flows are:

1. During Normal Operation:
   Pass-through traffic on ring 1: SDH/SONET frames arrive at PHY device 302-1, packets from the virtual containers in the frame are forwarded to ADM-MAC device 304-1, here the headers of the RPR frames are parsed and the corresponding frames forwarded to the ADM-MAC device 304-2 and further to PHY device 302-2, mapped into SDH/SONET frame and send onto ring 1.
   Pass-through traffic on ring 2: SDH/SONET frames arrive at PHY device 302-2, packets from the virtual containers in the frame are forwarded to ADM-MAC device 304-2, here the headers of the RPR frames are parsed and the corresponding frames forwarded to ADM-MAC device 304-1 and further to PHY device 302-1, mapped into SDH/SONET frame and send onto ring 2.
   Protection switching from ring 1 to ring 2: SDH/SONET frames arrive at PHY device 302-1, packets are forwarded to ADM-MAC device 304-1, from there back to PHY device 302-1, mapped into SDH/SONET frame and send onto ring 2.
   Protection switching from ring 2 to ring 1: SDH/SONET frames arrive at PHY device 302-2, packets are forwarded to ADM-MAC device 304-2, from there back to PHY device 302-2, mapped into SDH/SONET frame and send onto ring 1.

Traffic from switch or router device to ring 1 Packets are send to ADM-MAC devices 304-1 and 304-2, ADM-MAC devices 304-1 and 304-2 realize that traffic should be send by ADM-MAC device 304-2 to PHY device 302-2 to ring 1, ADM-MAC device 304-1 discards packets, ADM-MAC device 304-2 processes packets (encapsulation into RPR frame, queueing according to class of service parameter) and forwards to PHY device 302-2, PHY device 302-2 maps into SDH/SONET frame and sends onto ring 1.

Traffic from switch or router device to ring 2 Packets are send to ADM-MAC devices 304-1 and 304-2, ADM-MAC devices 304-1 and 304-2 realize that traffic should be send by ADM-MAC device 304-1 to PHY device 302-1 to ring 2, ADM-MAC device 304-2 discards packets, ADM-MAC device 304-1 processes packets (encapsulation into RPR frame, queuing according to class of service parameter) and forwards to PHY device 302-1, PHY device 302-1 maps into SDH/SONET frame and sends onto ring 2.

Traffic from ring 1 to switch or router device SDH/SONET frame arrive at PHY device 302-1, packets from virtual containers are forwarded to ADM-MAC device 304-1, after header parsing ADM-MAC device 304-1 determines that packets are destined for switch or router device, decapsulates IP packets out of RPR frame and queues packets for the interface to the switch or router device.

Traffic from ring 2 to switch or router device SDH/SONET frame arrive at PHY device 302-2, packets from virtual containers are forwarded to ADM-MAC device 304-2, after header parsing ADM-MAC device 304-2 determines that packets are destined for switch or router device, decapsulates IP packets out of RPR frame and queues packets for the interface to ADM-MAC device 304-1, ADM-MAC device 304-1 queues packets for the interface to the switch or router device.

2. Fiber Cut at Ring 1 Before PHY Device 302-1:
No change at local system, all protection switching happens at other nodes.

3. Fiber Cut at Rind 2 after PHY Device 302-1:
All traffic from switch or router device is forwarded towards ring 1, pass-through traffic still arriving on ring 2 is forwarded through ADM-MAC device 304-2 and PHY device 302-2 to ring 1, other protection switching happens at other nodes.

4. Fiber Cut at Ring 1 after PHY Device 302-2:
All traffic from switch or router device is forwarded towards ring 2, pass-through traffic still arriving on ring 1 is forwarded through ADM-MAC device 304-1 and PHY device 302-2 to ring 2, other protection switching happens at other nodes.

5. Fiber Cut at Ring 2 Before PHY Device 302-2:
No change at local system, all protection switching happens at other nodes.

6. Failure of PCB 300-2:
All traffic from switch or router device is forwarded through PCB 300-1 to ring 2, pass-through traffic on ring 1 is redirected by ADM-MAC device 304-1 and PHY device 302-1 to ring 2, protection switching is activated by nodes of rings connected to PCB 300-2, PCB 300-2 can be replaced without stopping remaining activities.

7. Failure of PCB 300-1:
All traffic from switch or router device is forwarded through PCB 300-2 to ring 1, pass-through traffic on ring 2 is redirected by ADM-MAC device 304-2 and PHY device 302-2 to ring 1, device drivers for direct connection of ADM-MAC device 304-2 to switch or router device are enabled, those for ADM-MAC device 304-1 are disabled, protection switching is activated by nodes connected to PCB 300-1, PCB 300-1 can re replaced without stopping remaining activities.

Figure 4:
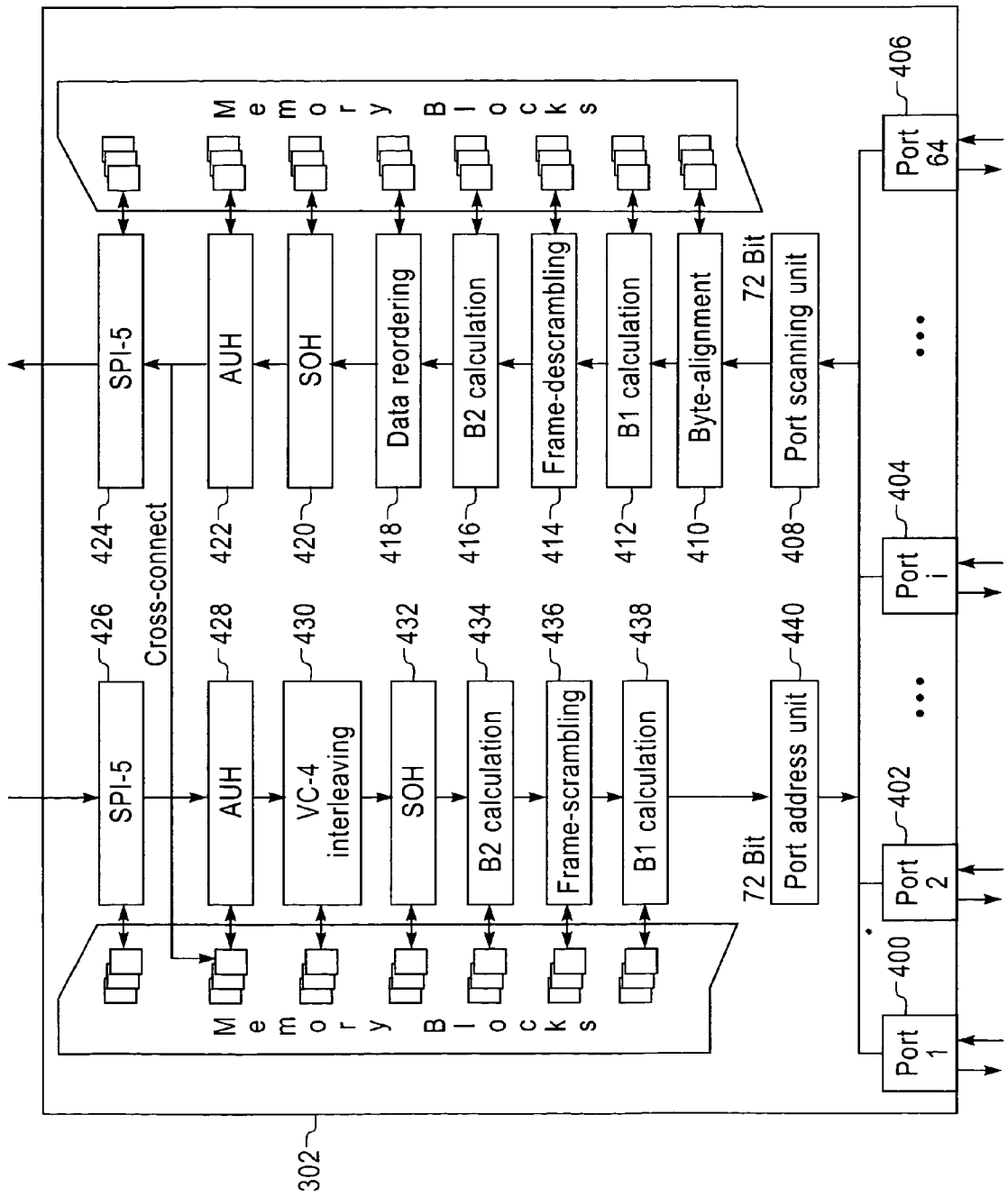
FIG. 4 shows a multiplexing device for combining at least two data signals having an input data rate into a single data stream having an output data rate being higher than the input data rate for transmission on a shared medium or vice versa in form of a STM-1 to STM-64 SDH/SONET framer.

Now, with reference to FIG. 4, there is depicted a PHY device for combining at least two data signals having an input data rate into a single data stream having an output data rate being higher than the input data rate for transmission on a shared medium or vice versa in form of a STM-1 to STM-64 SDH/SONET framer. The STM-1 to STM-64 Framer described in the following description is based on a data multiplexing or context switching architecture which allows a single framer to handle multiple STM-N frames with N={1, 4, 16, 64} up to an aggregate data rate corresponding to STM-64 (STS-192 or OC-192 in SONET notation), i.e., 9.96 Gb/s. These frames may use the corresponding sets of VC-4-xc, x={1, 4, 16, 64<=N} virtual containers. The support of VC-3-xc, x={3, 12, 48, 192} may also be possible. Since the units in the data path work on different ports/frames/VC-4s with each clock cycle, status information of the unit must be stored per frame or VC-4. There is information which must be stored per frame and unit or per VC-4 and unit and there is information which must be stored per frame or per VC-4 which is used by several units in the data path. The data path width for the STM-1 to STM-64 framer is chosen to 9 byte.

FIG. 4 shows the basic architecture of PHY device 302. The receive side of the multiplexing framer device consists of 64 serial STM-1 line port interfaces 400 to 406, 64 9-byte/2-word FIFOs (FIG. 5), a port scanning unit 408, a byte-alignment unit 410, a B1 calculation unit 412, a frame descrambling unit 414, a B2 calculation unit 416, a data reordering unit 418, a section overhead handler 420, an administrative unit handler 422 and an SPI-5 interface unit 424. A memory comprising of several memory elements are operatively coupled to each of the units. The memory stores information extracted from a data stream by the unit to which said memory is connected. A data bus and an address bus operatively couple the units in the Receive Path and Transmit Path, respectively. In FIG. 4 only the data bus is shown. The address bus is omitted in order to simplify the presentation.

The 64 serial STM-1 line ports 400 to 406 with corresponding clock inputs may be reusable also as 16 serial STM-4 line port interfaces, plus 4 8-bit STM-16 interfaces, plus 1 16-bit STM-64 interface according to the OIF-99-102 standard document. Each port 400 to 406 contains a multiplexor which multiplexes the data onto a data path width of 9 bytes. Considering the 2 byte STM-64 interface and the multiplexing to 9 byte one must consider that the next unit is a FIFO with 2x9-byte words and that 2x9=18 bytes is of course again an integer multiple of the 2-bytes starting point.

If there is a loss of signal (LOS) determined by a port 400 to 406, a microprocessor interrupt is generated. If the LOS is determined within two frames, an alarm indication signal (AIS) is generated causing the SOH and AUH units to handle the received SDH/SONET signal as a logical all-ones signal. The AIS is removed within 2 frames upon termination of the LOS failure condition.

The 64 9-byte/2-word FIFOs (FIG. 5) are used to buffer the incoming data from the STM-N lines.

Figure 5:
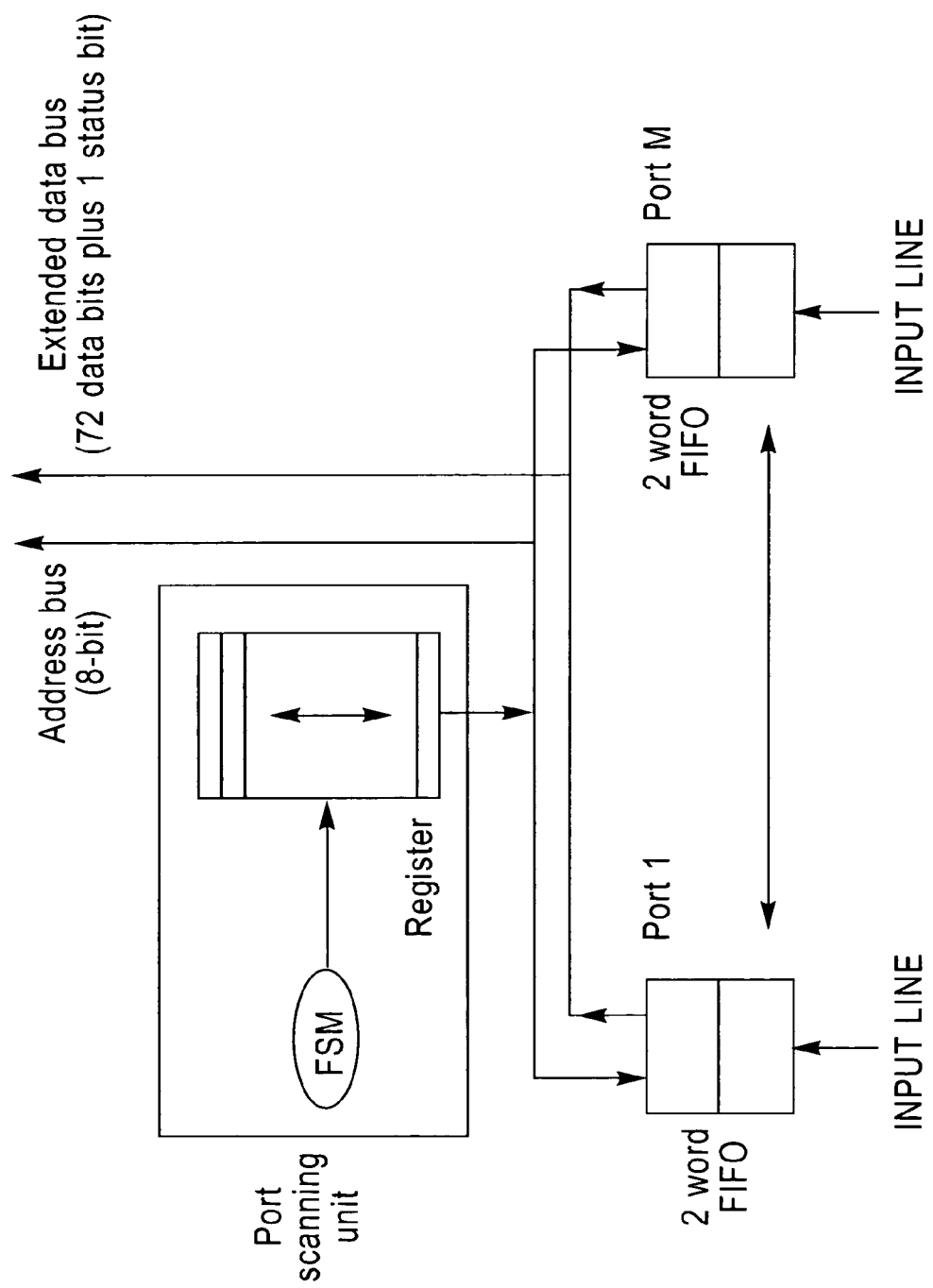
FIG. 5 shows a block diagram of the Port Scanning Unit coupled by address Bus and data bus to Port FIFO Registers.

Turning to FIG. 5 for the moment a block diagram of the Port Scanning Unit and ports are shown. The Port Scanning Unit includes a Finite STATE Machine (FSM) operatively coupled to a multiple location register A. Each port is identified by a port address which is loaded in one of the locations of the multiple location registers. Each port is provided with a port FIFO register in which data received from associated input lines is stored. Each port FIFO is coupled to a data bus. Likewise, the output from the multiple address register is coupled to an address bus which is coupled to all the port FIFOs. In this framer description the number of addresses (positions) in the multiple location register is identical to the number of ports. Likewise, the address bus is 72 bits and 1 status bit. Similarly, the port FIFO register includes two (2) words.

Still referring to FIG. 5, the Finite State Machine (FSM) in the port scanning unit simply outputs the content of one register onto the 8-bit on-chip address bus every clock cycle. As stated herein the contents of each register position is a Port Identification Number. To achieve this it simply reads the register addresses 1 to 64 in a round robin fashion. The sequence of port addresses inside the register determines directly the sequence of port addresses sent onto the address bus. The 2-word (72 bits each) receive FIFO in each port is read whenever the port address of the FIFO equals the address on the address bus. This means that the first word of the FIFO is written onto the data bus. If the address does not equal the port address of the FIFO the device driver which puts 1 word from the FIFO onto the data bus is disabled. Therefore only the data from the selected port are sent onto the data bus. Together with the data, the 1-bit FIFO full signal is sent onto the extended data bus. The FIFO full signal is "1" when data is available. After reading 1 word from the FIFO, this signals is set to "0". It returns to "1" when new data is written into the FIFO from the SDH/SONET line port. Hence, the FIFO full signal identifies data which must be processed if it is "1" and data which should not be processed (because the data has already been processed with the last read from this FIFO) if it is "0".

Each following unit in the receive data path will connect the logical unit to a series of memory units identified by the port address on the address bus. It will operate on the data whenever the status bit on the extended data bus is found to be "1". Otherwise it will do nothing in this clock cycle. This status bit together with the fact that the system clock for the whole receive data path is faster than the sum of all line ports ensures that there never is a data update in the port FIFO which is not read and that reading a FIFO without a data update to this FIFO since the last read operation does not lead to processing the same data twice.

The port scanning unit 408 reads in a configurable manner, e.g., round robin in case all ports are equal, with a single system clock the data from the FIFOs onto the receive data path. The system clock must be at least as fast as the fastest line input clock including the clock rate variations allowed according to the SDH/SONET standards. The port scanning unit 408 sets a mark, if a FIFO buffer was read without an input data update. In this case no unit in the data path will operate on this data word.

The byte-alignment unit 410 aligns the incoming 72-bit data so that its output corresponds correctly to 9-bytes in their SDH/SONET frame position. This alignment happens by searching for the A1/A2 byte alignment pattern in hunt mode, and by continuously checking the repetition of the A1/A2 byte alignment pattern in sync mode. If the pattern is not found for m consecutive frames, e.g., m=5, the unit returns from sync to hunt mode and an out of frame (OOF) error is asserted. If the OOF condition persists for a configurable instant of time TOOF, a LOF state is declared and a corresponding microprocessor interrupt is generated. Once in the LOF state, this state shall be left when the in-frame condition persists continuously for an instant of time TLOF. If the LOF state is determined within two frames, an alarm indication signal (AIS) is generated causing the SOH and AUH units to treat the received SDH/SONET signal as a logical all-ones signal. The AIS is removed within 2 frames upon termination of the LOF failure condition. Only the value of the so-called alignment-position, (1<=alignment-position <=71), the status (hunt, pre-sync, sync), the number of correctly found A1/A2 pattern (in pre-sync mode), and the number of not correctly found A1/A2 patterns (in sync mode) needs to be stored per frame.

The B1 calculation unit 412 calculates the B1 parity byte (even parity) over the complete STM-N frame before the frame is descrambled. The actual B1 byte is stored in memory per frame. The final value for a complete frame is stored in a way that it later can be used by the section overhead handler (SOH) unit 126.

The frame descrambling unit 414 descrambles all incoming frame bytes except the SOH bytes of the first row of the frame which are unscambled. The unit needs the following values per STM-N frame: N, 3*N, 9*N and 2430*N.

In this description the descrambling unit is similar to the frame scrambling unit in the transmit path and one implemented in VHDL code. The important difference in the implementation of this unit to a standard unit for frame scrambling is that it connects to different memory units depending on the port address provided on the address bus. The standard frame scrambling unit stores all variables locally without a need to connect to different memory units. The unit in this implementation needs to store certain variables in special memory units and it must write the information belonging to the port processed in the last clock cycle at the beginning of the new clock cycle into the corresponding memory. It must then copy the stored information corresponding to the present port address from the corresponding memory into the local variables. Only as the next step the unit can process the data. It will write the updated data to the corresponding memory units at the beginning of the following clock cycle. The following VHDL code shows this:

```
ENTITY vFrameScrambler IS
PORT
( -- Start of Port List
Data_in : in STD_LOGIC_VECTOR(0 to 71) ;
Data_out : out STD_LOGIC_VECTOR(0 to 71) ;
SoF_in : in STD_LOGIC ;
SoF_out : out STD_LOGIC ;
ADDR_in : in STD_LOGIC_VECTOR(0 to 5);
GRA_in : in STD_LOGIC_VECTOR(0 to 60);
GRA_out : out STD_LOGIC_VECTOR(0 to 60);
GRA2_in : in STD_LOGIC_VECTOR(0 to 71);
GRA2_out : out STD_LOGIC_VECTOR(0 to 71);
ADDR_out : out STD_LOGIC_VECTOR(0 to 5);
Clk_in : in STD_LOGIC
); -- End of Port List
ARCHITECTURE Behavior OF vFrameScrambler IS
BEGIN -- Behavior
p1: process
-- LOCAL variables:
  variable   g0    :    STD_LOGIC_VECTOR(0    to
71)   := tconv("FE041851E459D4FA1C", hex);
  variable gn : STD_LOGIC_VECTOR(0 to 71);
  VARIABLE scramble_flag : integer range 0 to 1 := 1;
    -- 0 deactivates
    -- frame descrambling
  variable ADDRESS : STD_LOGIC_VECTOR(0 to 5);
  -- ALL variables defined after this line must be stored per
```

```
frame:
  variable g : STD_LOGIC_VECTOR(0 to 71);
  VARIABLE byte_cnt : integer range 0 to 155530 := 0;
  -- Variables which determine the SDH frame
  --------------+------+------+-------+--------
  -- stm_n       | 1    | 4    | 16    | 64
  -- stm_n_3     | 3    | 12   | 48    | 192
  -- stm_n_9     | 9    | 36   | 144   | 567
  -- stm_n_2430  | 2430 | 9720 | 38880 | 155520
  VARIABLE stm_n : integer range 1 to 64 := 64;
  variable stm_n_3 : integer range 3 to 192 := 192;
  variable stm_n_9 : integer range 9 to 576 := 576;
  variable stm_n_2430 : integer range 2430 to 155520 := 155520;
  BEGIN -- process p1
  WAIT on clk_in until clk_in='1';
  -- update status information to GRA
  ADDR_out <= ADDRESS;
  GRA_out(0 to 6) <= CONV_STD_LOGIC_VECTOR(stm_n,7);
  GRA_out(7 to 14) <= CONV_STD_LOGIC_VECTOR(stm_n_3,8);
  GRA_out(15 to 24) <=
  CONV_STD_LOGIC_VECTOR(stm_n_9,10);
  GRA_out(25 to 42) <=
  CONV_STD_LOGIC_VECTOR(stm_n_2430,18);
  GRA_out(43 to 60) <=
  CONV_STD_LOGIC_VECTOR(byte_cnt,18);
  GRA2_out(0 to 71) <= g;
  -- read status information from GRA
  ADDRESS := ADDR_in;
  stm_n := CONV_INTEGER(tconv(GRA_in(0 to 6)));
  stm_n_3 := CONV_INTEGER(tconv(GRA_in(7 to 14)));
  stm_n_9 := CONV_INTEGER(tconv(GRA_in(15 to 24)));
  stm_n_2430 := CONV_INTEGER(tconv(GRA_in(25 to 42)));
  byte_cnt := CONV_INTEGER(tconv(GRA_in(43 to 60)));
  g := GRA2_in(0 to 71);
  g0 := tconv("FE041851E459D4FA1C", hex);
  gn(0) := g(2) xor g(3) xor g(5) xor g(6);
  gn(1) := g(3) xor g(4) xor g(6) xor g(7);
  gn(2) := g(1) xor g(2) xor g(4) xor g(5) xor g(7);
  gn(3) := g(1) xor g(3) xor g(5) xor g(6);
  gn(4) := g(2) xor g(4) xor g(6) xor g(7);
  gn(5) := g(1) xor g(2) xor g(3) xor g(5) xor g(7);
  gn(6) := g(1) xor g(3) xor g(4) xor g(6);
  gn(7) := g(2) xor g(4) xor g(5) xor g(7);
  -- --------------------------------------------------------
  gn(8) := g(10) xor g(11) xor g(13) xor g(14);
  gn(9) := g(11) xor g(12) xor g(14) xor g(15);
  gn(10) := g(9) xor g(10) xor g(12) xor g(13) xor g(15);
  gn(11) := g(9) xor g(11) xor g(13) xor g(14);
  gn(12) := g(10) xor g(12) xor g(14) xor g(15);
  gn(13) := g(9) xor g(10) xor g(11) xor g(13) xor g(15);
  gn(14) := g(9) xor g(11) xor g(12) xor g(14);
  gn(15) := g(10) xor g(12) xor g(13) xor g(15);
  -- --------------------------------------------------------
  gn(16) := g(18) xor g(19) xor g(21) xor g(22);
  gn(17) := g(19) xor g(20) xor g(22) xor g(23);
  gn(18) := g(17) xor g(18) xor g(20) xor g(21) xor g(23);
  gn(19) := g(17) xor g(19) xor g(21) xor g(22);
  gn(20) := g(18) xor g(20) xor g(22) xor g(23);
  gn(21) := g(17) xor g(18) xor g(19) xor g(21) xor g(23);
  gn(22) := g(17) xor g(19) xor g(20) xor g(22);
  gn(23) := g(18) xor g(20) xor g(21) xor g(23);
  -- --------------------------------------------------------
  gn(24) := g(26) xor g(27) xor g(29) xor g(30);
  gn(25) := g(27) xor g(28) xor g(30) xor g(31);
  gn(26) := g(25) xor g(26) xor g(28) xor g(29) xor g(31);
  gn(27) := g(25) xor g(27) xor g(29) xor g(30);
  gn(28) := g(26) xor g(28) xor g(30) xor g(31);
  gn(29) := g(25) xor g(26) xor g(27) xor g(29) xor g(31);
  gn(30) := g(25) xor g(27) xor g(28) xor g(30);
  gn(31) := g(26) xor g(28) xor g(29) xor g(31);
  -- --------------------------------------------------------
  gn(32) := g(34) xor g(35) xor g(37) xor g(38);
  gn(33) := g(35) xor g(36) xor g(38) xor g(39);
  gn(34) := g(33) xor g(34) xor g(36) xor g(37) xor g(39);
  gn(35) := g(33) xor g(35) xor g(37) xor g(38);
  gn(36) := g(34) xor g(36) xor g(38) xor g(39);
  gn(37) := g(33) xor g(34) xor g(35) xor g(37) xor g(39);
  gn(38) := g(33) xor g(35) xor g(36) xor g(38);
  gn(39) := g(34) xor g(36) xor g(37) xor g(39);
  -- --------------------------------------------------------
  gn(40) := g(42) xor g(43) xor g(45) xor g(46);
  gn(41) := g(43) xor g(44) xor g(46) xor g(47);
  gn(42) := g(41) xor g(42) xor g(44) xor g(45) xor g(47);
  gn(43) := g(41) xor g(43) xor g(45) xor g(46);
  gn(44) := g(42) xor g(44) xor g(46) xor g(47);
  gn(45) := g(41) xor g(42) xor g(43) xor g(45) xor g(47);
  gn(46) := g(41) xor g(43) xor g(44) xor g(46);
  gn(47) := g(42) xor g(44) xor g(45) xor g(47);
  -- --------------------------------------------------------
  gn(48) := g(50) xor g(51) xor g(53) xor g(54);
  gn(49) := g(51) xor g(52) xor g(54) xor g(55);
  gn(50) := g(49) xor g(50) xor g(52) xor g(53) xor g(55);
  gn(51) := g(49) xor g(51) xor g(53) xor g(54);
  gn(52) := g(50) xor g(52) xor g(54) xor g(55);
  gn(53) := g(49) xor g(50) xor g(51) xor g(53) xor g(55);
  gn(54) := g(49) xor g(51) xor g(52) xor g(54);
  gn(55) := g(50) xor g(52) xor g(53) xor g(55);
  -- --------------------------------------------------------
  gn(56) := g(58) xor g(59) xor g(61) xor g(62);
  gn(57) := g(59) xor g(60) xor g(62) xor g(63);
  gn(58) := g(57) xor g(58) xor g(60) xor g(61) xor g(63);
  gn(59) := g(57) xor g(59) xor g(61) xor g(62);
  gn(60) := g(58) xor g(60) xor g(62) xor g(63);
  gn(61) := g(57) xor g(58) xor g(59) xor g(61) xor g(63);
  gn(62) := g(57) xor g(59) xor g(60) xor g(62);
  gn(63) := g(58) xor g(60) xor g(61) xor g(63);
  -- --------------------------------------------------------
  gn(64) := g(66) xor g(67) xor g(69) xor g(70);
  gn(65) := g(67) xor g(68) xor g(70) xor g(71);
  gn(66) := g(65) xor g(66) xor g(68) xor g(69) xor g(71);
  gn(67) := g(65) xor g(67) xor g(69) xor g(70);
  gn(68) := g(66) xor g(68) xor g(70) xor g(71);
  gn(69) := g(65) xor g(66) xor g(67) xor g(69) xor g(71);
  gn(70) := g(65) xor g(67) xor g(68) xor g(70);
  gn(71) := g(66) xor g(68) xor g(69) xor g(71);
  IF( SoF_in = '1' ) THEN
  byte_cnt := stm_n_3 − 2;
    -- stm_n_3 − 3 + 1, the −3 comes from
    -- the byte-alignment unit
  END IF;
  IF ( byte_cnt > 0 ) THEN
  byte_cnt := byte_cnt + 9;
    -- increase the byte_cnt by the data
    -- path width every cycle
  END If;
  if ( byte_cnt = stm_n_2430 + 10) then
  byte_cnt := 10; -- 2430 * stm_n means end of frame
  end if;
  if ( byte_cnt > stm_n_9 + 1) then
  g := gn;
  else
  g := g0;
  END IF;
  IF ( byte_cnt > stm_n_9 AND byte_cnt <= stm_n_2430 AND
  scramble_flag = 1 ) THEN
    Data_out <= Data_in(0 to 71) xor g(0 to 71);
  ELSE
    Data_out <= Data_in;
  END IF;
  SoF_out <= SoF_in;
  END PROCESS ;
  END Behavior ;
```

In this example, GRA and GRA2 are memory registers needed to store variables from this unit per port. The fact that two register blocks were used is caused by the size of the data and has nothing to do with different memory units as discussed before. The assignment of the registers to specific memory units according to the valid port address is done outside this logical unit. The important point is that the hardware description code shown above defines "local variables" which are not stored in specific memory each clock cycle but which will simply be overwritten by data from a new port in the next clock cycle, as well as "variables which must be stored per frame" and hence per port. Another important point are the variables stm_n, stm_n_3, stm_n_9 and stm_n_2430. These are variables stored per port address and they determine the frame type, i.e. N in the STM-N. In principle stm_n would be sufficient since all other values are just multiples of this value, however all the values must be stored in memory since synthesizing a chip design can not be done with numbers which still must be calculated. stm_n could be skipped since it is not really needed in this unit. stm_n_9=9*stm_n determines the number of bytes in a row which are section overhead bytes, all following bytes are payload bytes. stm_n_2430 determines the number of bytes in a single row and therefore the end of one row and the start of the next row of an STM-N frame. stm_n_3 is needed for aligning the data correctly with the frame.

All the other units in the data path need some of these numbers stm_n, stm_n_3, stm_n_9 or stm_n_2430 exactly in the same way as shown above and they also need to store data into port specific memory at the beginning of a clock cycle and to copy data from port specific memory into local variables before processing the data on the data bus exactly in the same way as in the above example.

The B2 calculation unit 416 calculates the 3*N B2 bytes of the STM-N frame as BIP-N×24 even parity over the complete frame except the SOH bytes of the first 3 rows after frame descrambling.

The data reordering unit 418 reorders each incoming row of an STM-N frame so that the byte-interleaving of the N STM-1 sub-frames is removed and the 9 byte output corresponds to 9 consecutive bytes of a single STM-1 sub-frame in case of SOH bytes and 9 consecutive bytes of a single VC-4-xc in case of SDH/SONET payload bytes. The H3 pointer bytes are reordered in a way compatible with the payload bytes not the SOH bytes. This unit needs a 2×64×9 bytes buffer for operation.

The section overhead handler (SOH) unit 420 retrieves all relevant SOH bytes out of the incoming data and stores these bytes per frame in memory. Each SOH byte is read/write accessible by the microprocessor. A word-mask is set which distinguishes the data bytes from the SOH bytes for the following units in the receive data path. This mask is forwarded with the data on the data path. In case that all the 9 bytes are SOH bytes, the mask is "00", in case, the first 6 bytes are SOH bytes and the last 3 bytes are data bytes (H3 bytes and pointer decrement), the mask is "01", in case, the first 3 bytes are SOH bytes and the last 6 bytes are data bytes (pointer increment), the mask is "10", in case of pure 9 byte data the mask is "11". No further SOH/data byte pattern occurs. This unit handles regenerator section overhead (RSOH) bytes and multiplex section overhead (MSOH) bytes.

The administrative unit handler (AUH) unit 422 retrieves all path overhead (POH) bytes from the incoming data and stores these bytes per VC-4 in memory. Each POH byte is read/write accessible by the microprocessor. For finding the POH bytes in the incoming data, the pointer value of the AU-4, evaluated by the SOH unit and stored in memory, is used in connection with a corresponding byte counter and the masking pattern provided with the incoming data on the data bus. The AUH unit will forward only the C-4 payload bytes into a FIFO from which the ADM-MAC device then reads the data as RPR frames which themselves may be based on IP frames, ATM cells or e.g. Ethernet frames.

SPI-5 interfaces 424 and 426 allows transmission of data between PHY device 302 and ADM-MAC device 304. At the SPI-5 interface short bursts of data belonging to a single data channel are exchanged. A single data channel may be formed by data from one of the specific rings 100-1 to 100-n or even by data from a single virtual SDH/SONET container transmitted on one of the rings 100-1 to 100-n. The SPI-5 interface as standardized by the "Optical Internet working Forum (OIF)" supports at least 64 independent data channels and up to 768 data channels in a pooled mode (i.e. without feedback on the status of individual FIFO data queues, but only on pools of queues). The size of data bursts belonging to a single channel is always a multiple of 32 bytes for the SPI-5 interface. Hence, there are at least 32 bytes transmitted to a specific data channel before bytes are transmitted for another data channel. There is no need to first assemble complete packages for transmission over the interface, just 32 bytes of data for a single channel must be assembled.

The transmit side consists of SPI-5 interface 426, an administrative unit handler 428, a VC-4 interleaving unit 430, a section overhead handler unit 432, a B2 calculation unit 434, a frame-scrambling unit 436, a B1 calculation unit 438 and a port address unit 440.

The cross-connect in FIG. 4 provides a means for sending certain SDH/SONET virtual containers from the receive side of the framer to its transmit side, thereby bypassing the ADM-MAC devices. This enables the possibility to define certain connections in the SDH/SONET system which bypass several RPR nodes and thereby reduce the workload for these nodes.

The administrative unit handler (AUH) unit 428 creates the path overhead bytes per VC-4 and maps the payload (ATM cell, IP packets or Ethernet frames) into the VC-4s. No pointer generation function is needed and the corresponding AU-4 pointer value will be set to zero. The VC-4 interleaving unit 430 performs byte-interleaving of the various VC-4s belonging to a single STM-N frame. This unit will need a 2×64×9 byte buffer.

The section overhead handler (SOH) unit 432 creates the SOH bytes for each of the STM-N frames.

The B2 calculation unit 434 calculates the 3*N B2 bytes of an STM-N frame as BIP-N×24 even parity over the complete frame except the SOH bytes of the first 3 rows before frame scrambling. The unit stores the actual B2 values in memory per frame and the final B2 values for including into the B2 bytes of the next frame for the same port by the SOH unit.

The frame-scrambling unit 436 which is identical to the frame descrambling unit in the receive path scrambles all frame bytes except the SOH bytes of the first row of the frame which are left unscambled. The unit needs the following values per STM-N frame: N, 3*N, 9*N and 2430*N.

The B1 calculation unit 438 which calculates the B1 parity byte (even parity) over the complete STM-N frame after frame-scrambling. The actual B1 byte is stored in memory per frame. The final value for a complete frame is stored in a way that it later can be used by the section overhead handler (SOH) unit.

The port address unit 440 forwards on the data bus the data from each frame and on the address bus the port address to the corresponding FIFO at the output ports. If the address on the address bus is identical to the port address the corresponding FIFO receives the data. All other FIFOs will not receive the data. Preferably, FIFOs are read on the line port side according to their line port clock. The forwarding schedule is configurable. In case that all ports are equal (64 STM-1, 16 STM-4, or 4 STM-16) the schedule will be a simple round robin. Writing into the output port FIFOs is done with the system clock, reading out of the port FIFOs is done with the specific line clock.

Figure 6:
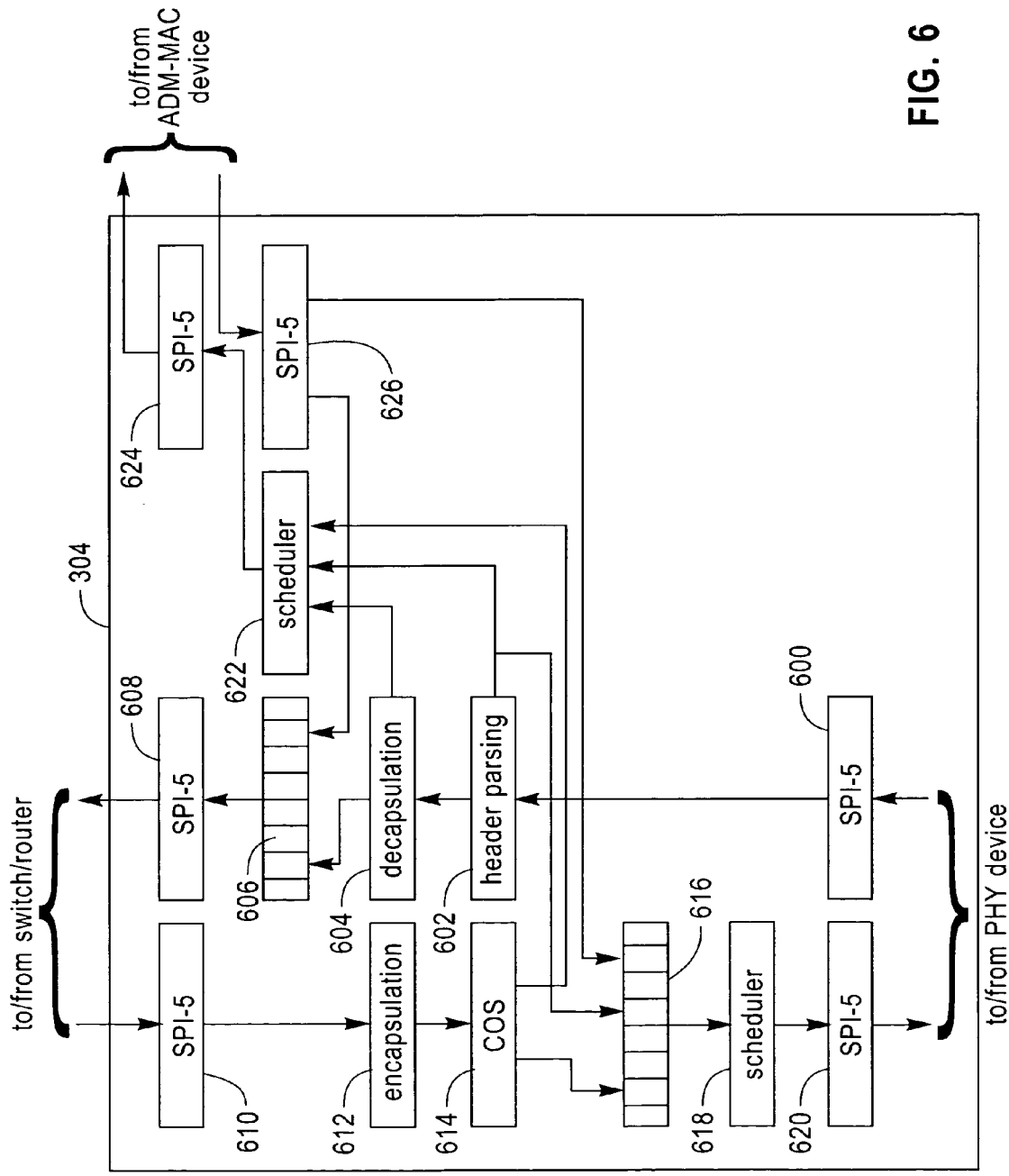
FIG. 6 illustrates the architecture of the device interfacing the multiplexing framer device, the switch or router device and a second interfacing device to provide plug & play redundancy.

Now turning to FIG. 6, the architecture of ADM-MAC device 304 that provides data path as described above is illustrated. The receive side of the ADM-MAC device consists of an SPI-5 interface receive unit 600, a header parsing unit 602, a decapsulation unit 604, a queuing memory 606 and an SPI-5 interface transmit unit 608. ADM-MAC device 304 further comprises a control logic unit that is not represented for sake of clarity. The queuing memory 606 is needed for two purposes. Firstly it has to assemble complete IP packets for transmission to the switch or router device, secondly it must queue data coming from the PHY device if a packet from the second ADM-MAC device received through unit 626 is just occupying the SPI-5 interface transmit unit 608. The header parsing unit 602 and the decapsulation unit 604 are designed in the same data multiplexing or context switching architecture as the units of the PHY device shown in FIG. 4 and may process RPR frames from ring **100-*i* at one clock cycle and from ring 100-*k* at the next cycle (i,k=1, . . . , n). The port information from FIG. 4 corresponds to the data channel information provided through the SPI-5 interface receive unit 600. The encapsulation unit 612 and the COS unit 614** are designed in the normal way since the switch or router always transmits packets non-interleaved.

RPR frames are received in the header parsing unit 602 from PHY device 302 through SPI-5 interface receive unit 600. Based on the header parsing results the control logic knows the destination of the frames. If packets have not to be transmitted to switch or router device, they are transmitted to the second ADM-MAC through scheduler unit 622 and SPI-5 interface transmit unit 624 without decapsulation through decapsulation unit 604. If packets have to be sent back to the same PHY device for transmission to the second ring in case of protection switching they are queued in memory 616. If packets have to be transmitted to switch or router device, they are decapsulated out of RPR frames in decapsulation unit 604 and then queued in queuing memory 606 for SPI-5 interface transmit unit 608 if this SPI-5 interface is the active one. If the link layer interface is not the active one, packets will be sent to the second ADM-MAC through scheduler unit 622 and SPI-5 interface transmit unit 624.

The transmit side of ADM-MAC consists of an SPI-5 interface receive unit 610, an encapsulation unit 612, a Class Of Service unit (COS) 614, a queuing memory 616, a scheduler unit 618 and an SPI-5 interface transmit unit 620. The queuing memory 616 is needed to buffer data from the three data streams arriving at queuing memory 616 and all scheduled to be transmitted to the PHY device through SPI-5 interface transmit unit 620. All three data streams need fair access to SPI-5 interface transmit unit 620 and must be interleaved accordingly by the scheduler unit 618. The simplest scheduling would be done by reading the memory channels in round robin procedure. The first data stream is that from the switch or router device received through SPI-5 interface receive unit 610. The second data stream is that from the second ADM-MAC device received through SPI-5 interface receive unit 626. The third data stream is that from the PHY device received through SPI-5 interface receive unit 600 in case of automatic protection switching.

Packets are received in encapsulation unit 612 through SPI-5 interface receive unit 610 to be encapsulated into RPR frames and queued in queuing memory 616 according to class of service determined in COS unit 614. Scheduler unit 618 transmits RPR frames from queuing memory 616 to SPI-5 interface transmit unit 620 so that RPR frames are transmitted to corresponding ring through PHY device 302. The data channel information of the SPI-5 interface ensures that the packets are transmitted to the correct ring out of the rings 100-1 to **100-*n***.

ADM-MAC also comprises a scheduler unit 622, an SPI-5 interface transmit unit 624 and an SPI-5 interface receive unit 626 to transmit packets from an ADM-MAC to the other and provide plug & play redundancy as described above. Such redundancy is obtained by connecting two ADM-MACs as illustrated on FIG. 3 so that an ADM-MAC could receive and transmit packets from the other one as well as determining master/slave PCBs to active one of both link layer interfaces.

Packets receive from the ring through SPI-5 interface receive unit 600, header parsing unit 602 and decapsulation unit 604 are transmitted to scheduler unit 622 so as to be send to the link layer interface of the other ADM-MAC through SPI-5 interface transmit unit 624. Likewise, packets received from the switch or router device through SPI-5 interface receive unit 610, encapsulation unit 612 and COS unit 614 and packets received from the ring through SPI-5 interface receive unit 600 and header parsing unit 602 are transmitted to scheduler unit 622 so as to be send to the PHY device connected to the other ADM-MAC through SPI-5 interface transmit unit 624.

Packets received from another ADM-MAC through SPI-5 interface receive unit 626 are queued in queuing memories 606 and 616 to be transmitted to switch or router device and PHY device 302 respectively.

As mentioned above, ADM-MAC device further comprises a control unit (not represented) to handle data transmission, i.e. to process RPR frames and packets, as described above by reference to FIG. 3. Since this control unit is also used to provide redundancy feature, a control signal is used to determine which of the ADM-MAC device 304-1 and 304-2 link layer interfaces is active.

Figure 7:
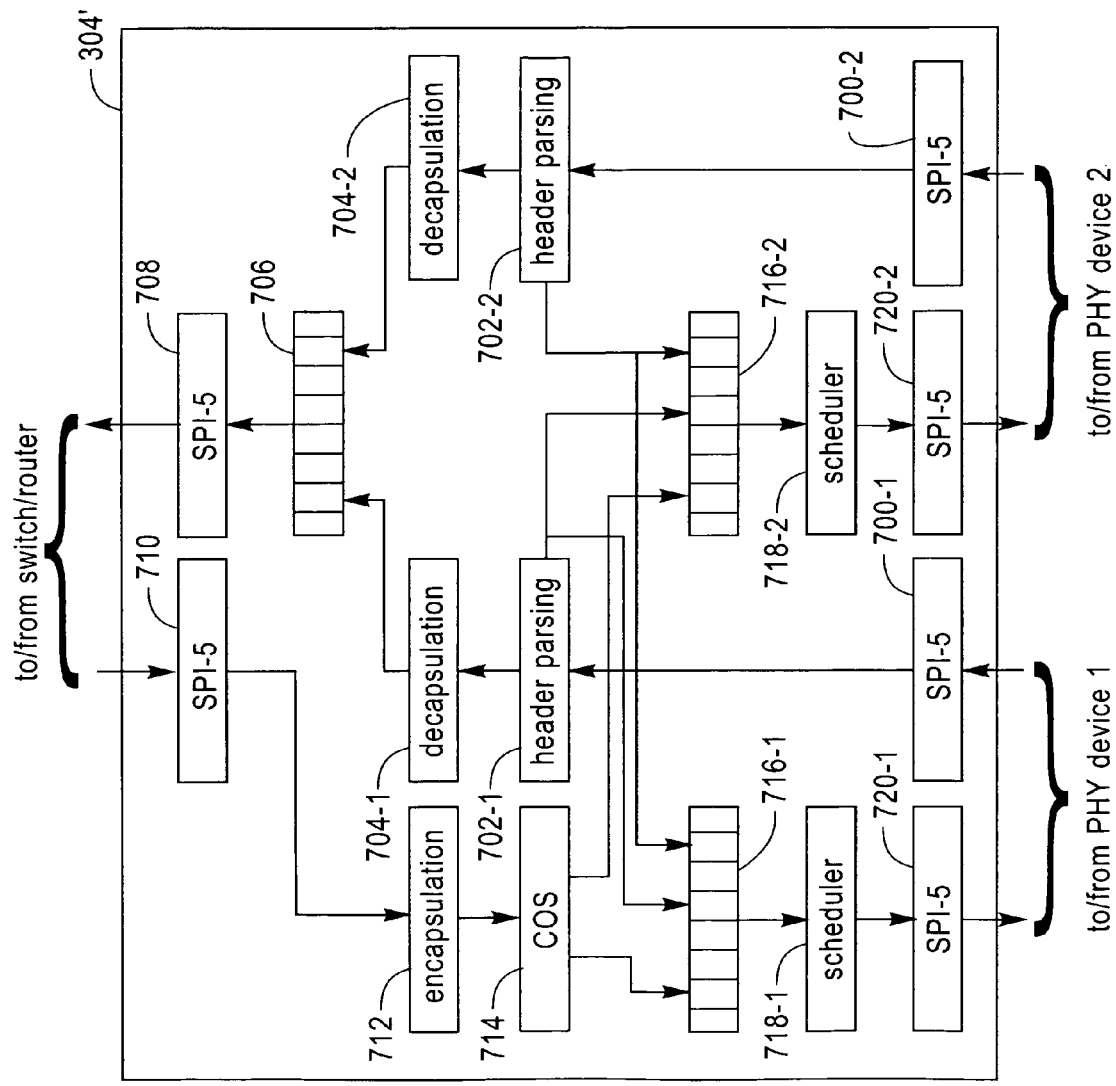
FIG. 7 illustrates the architecture of a device interfacing the two multiplexing framer devices and a switch or router device.

FIG. 7 illustrates the architecture of a simplified ADM-MAC device 304', adapted to interface PHY devices 302-1 and 302-2 and a switch or router device. This simplified ADM-MAC device 304' is designed to replace both ADM-MAC devices 304-1 and 304-2 however, it does not support plug & play redundancy.

The receive side of the ADM-MAC device 304' consists of two SPI-5 interface receive units 700-1 and 700-2, two header parsing units 702-1 and 702-2, two decapsulation units 704-1 and 704-2, a queuing memory 706 and an SPI-5 interface transmit unit 708. ADM-MAC device 304' further comprises a control logic unit that is not represented for sake of clarity. The queuing memory 706 is needed to assemble complete IP packets for transmission to the switch or router device from data received from both PHY devices referred to as PHY device 1 and PHY device 2. Header parsing units 702-1 and 702-2 and decapsulation units 704-1 and 704-2 are used like header parsing unit 602 and decapsulation unit 604 of ADM-MAC devices 304-1 and 304-2. RPR frames are received in the header parsing units 702-1 and 702-2 from PHY device 1 and PHY device 2 through SPI-5 interfaces 700-1 and 700-2, respectively. After headers of frames have been parsed, the control logic unit checks their destinations. If packets have to be transmitted to switch or router device, they are queued in memory 706 for SPI-5 interface transmit unit 708 after packets have been decapsulated out of RPR frames in decapsulation units 704-1 and 704-2. If packets have not to be transmitted to switch or router device, they are transmitted from a first PHY device to the second PHY device or transmitted back to the same PHY device through queuing memory 716-1 or 716-2, scheduler unit 718-1 or 718-2 and SPI-5 interface transmit unit 720-1 or 720-2.

The transmit side of ADM-MAC 304' consists of SPI-5 interface receive unit 710, an encapsulation unit 712, a Class Of Service unit (COS) 714, two queuing memories 716-1 and 716-2, two scheduler units 718-1 and 718-2 and two SPI-5 interface transmit units 720-1 and 720-2. The queuing memories 716-1 and 716-2 are needed to buffer data received from the switch or router through SPI-5 interface receive unit 710 or from header parsing units 702-2 and 702-1.

Packets are received in encapsulation unit 712 through SPI-5 interface receive unit 710 to be encapsulated into RPR frames and queued in queuing memories 716-1 and 716-2 according to class of service determined in COS unit 714. Scheduler units 718-1 and 718-2 transmit RPR frames from queuing memories 716-1 and 716-2 to SPI-5 interface transmit units 720-1 and 720-2 respectively so that RPR frames are transmitted to corresponding ring through PHY device 1 and PHY device 2. The data channel information of the SPI-5 interface ensures that the packets are transmitted to the correct ring out of the rings 100-1 to 100-$n$.

While the invention has been described in term of preferred embodiments, those skilled in the art will recognize that the invention can be implemented differently. Likewise, in order to satisfy local and specific requirements, a person skilled in the art may apply to the solution described above many modifications and alterations all of which, however, are included within the scope of protection of the invention as defined by the following claims.

The invention claimed is:

1. An add/drop device for connecting at least two network dual rings to a single link layer interface, said device comprising:
   a first and a second port for each of said at least two network dual rings for receiving signals from or transmitting signals to each of said at least two network dual rings;
   first and second multiplexing framer means adapted for:
      combining at least two data signals having their own input data rates into a single output data streams having an output data rates higher than said input data rates of said data signals;
      splitting a single input data stream having an input data rate into at least two data signals having their own output data rates, lower than said input data rate of said single input data stream;
      said first multiplexing framer means receiving signals from or transmitting signals to said first ports and said second multiplexing framer means receiving signals from or transmitting signals to said second ports;
   add/drop means adapted for:
      extracting data from a single output data stream received from one of said first and second multiplexing framer means and transmitting said extracted data to said link layer interface;
      inserting data received from said link layer interface to a single output data stream received from one of said first and second multiplexing framer means;
      transmitting a single output data stream received from one of said first and second multiplexing framer means, wherein data may have been extracted or inserted, to one of said first and second multiplexing framer means,
      wherein said add/drop means consists of a single device interfacing each of said first and second multiplexing framer means and said link layer and comprises:
         first frame header parsing means associated to said first multiplexing framer means and second frame header parsing means associated to said second multiplexing framer means;
         first frame decapsulation means associated to said first multiplexing framer means and second frame decapsulation means associated to said first multiplexing framer means;
         memorization means;
         wherein frames received from one of said first and second multiplexing framer means are parsed in associated frame header parsing means and packets that have to be transmitted to said link layer interface are decapsulated out of the frames in associated frame decapsulation means and stored in said memorization means.

2. The add/drop device of claim 1 further comprising a control logic for determining which of said ports need to be handled within which clock cycle with regard to its input data rate.

3. The add/drop device of claim 2 wherein said control logic is configured so that a port having a higher input data rate is accessed proportionally more often than a port having a lower input data rate.

4. The add/drop device of claim 1 wherein said frame header parsing means is adapted for processing frame headers from different data channels in consecutive clock cycles.

5. The add/drop device of claim 1 wherein said frame decapsulation means are adapted for processing frames from different data channels in consecutive clock cycles.

6. The add/drop device of claim 1 wherein said add/drop means comprises:
   frame encapsulation means;
   classification means adapted to classify frames according to their destination and priorities;
   first memorization means associated to said first multiplexing framer means, wherein said classified frames that have to be transmitted to said first multiplexing means and the frames received from said first and second multiplexing means that have to be transmitted to said first multiplexing means are stored; and,
   second memorization means associated to said second multiplexing framer means, wherein said classified frames that have to be transmitted to said second multiplexing means and the frames received from said first and second multiplexing means that have to be transmitted to said second multiplexing means are stored.

7. The add/drop device of claim 1 wherein said add/drop means consists in two similar devices, each of one interfacing one of said first and second multiplexing framer means, said link layer interface and the other of said two similar devices.

8. The add/drop device of claim 7 wherein each of said similar devices comprises:
   frame encapsulation means;
   classification means adapted to classify frames according to their priorities; and,
   memorization means wherein said classified frames and the frames received from said one of said first and second multiplexing means and from said other of said similar device that have to be transmitted to said one of said first and second multiplexing means are stored.

9. The add/drop device of claim 7 wherein each of said first and second multiplexing framer means is associated to one of said similar devices in a different physical subsystem, each of said physical subsystem comprising control logic means adapted to inform the other of said physical subsystem when a failing operation is detected so that one of said physical subsystem may be changed without stopping remaining activities of said add/drop device.

* * * * *